US009211883B2

(12) United States Patent
Tachibana (10) Patent No.: US 9,211,883 B2
(45) Date of Patent: Dec. 15, 2015

(54) CONTROL APPARATUS OF VEHICLE (75) Inventor: Toshiki Tachibana, Miyoshi (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 0 days.

(21) Appl. No.: 14/382,887

(22) PCT Filed: Mar. 7, 2012

(86) PCT No.: PCT/JP2012/001568
§ 371 (c)(1),
(2), (4) Date: Sep. 4, 2014

(87) PCT Pub. No.: WO2013/132534
PCT Pub. Date: Sep. 12, 2013

(65) Prior Publication Data
US 2015/0025760 A1    Jan. 22, 2015

(51) Int. Cl.
B60W 10/101  (2012.01)
B60W 30/188  (2012.01)
B60W 10/06   (2006.01)
F16H 9/18    (2006.01)

(52) U.S. Cl.
CPC ............ B60W 10/101 (2013.01); B60W 10/06 (2013.01); B60W 30/1882 (2013.01); F16H 9/18 (2013.01)

(58) Field of Classification Search
None
See application file for complete search history.

(56) References Cited

U.S. PATENT DOCUMENTS

2001/0021683 A1* 9/2001 Takagi et al. .................. 477/37
2006/0027413 A1* 2/2006 Tabata et al. ................. 180/305
2008/0027614 A1* 1/2008 Field et al. ..................... 701/60
2008/0300761 A1* 12/2008 Matsubara et al. ............ 701/61
2009/0082154 A1* 3/2009 Iwase et al. ................... 475/150
2009/0227417 A1* 9/2009 Imamura et al. .............. 477/5
2010/0069196 A1* 3/2010 Shibata et al. ................ 477/3
2010/0125021 A1* 5/2010 Matsubara et al. ............ 477/5
2010/0174456 A1* 7/2010 Beaudoin et al. ............. 701/51
2011/0127095 A1* 6/2011 Imamura et al. ......... 180/65.285
2011/0231048 A1* 9/2011 Matsubara et al. ............ 701/22

FOREIGN PATENT DOCUMENTS

JP  2004-324842 A  11/2004
JP  2009-255617 A  11/2009

OTHER PUBLICATIONS

International Search Report of PCT/JP2012/001568 dated May 29, 2012 [PCT/ISA/210].

* cited by examiner

Primary Examiner — Justin Holmes
(74) Attorney, Agent, or Firm — Sughrue Mion, PLLC (57) ABSTRACT Disclosed is a control apparatus of a vehicle which can control an internal combustion engine and a continuously variable transmission. The control apparatus is partly constituted by an ECU adapted to calculate a required drive force and a fuel consumption amount G. The ECU then calculates a time required for the speed change operation with reference to a speed change time map when a variation amount of the accelerator opening degree and a change speed of the accelerator opening degree are calculated. The ECU then calculates the speed change speed, and calculates a transmission efficiency $\eta$ of a CVT. The ECU then calculate the ratio $G/\eta$ of the transmission efficiency $\eta$ and the fuel consumption amount G, thereby setting the engine rotational speed at which the above ratio is at the smallest level as a target engine rotational speed.

5 Claims, 8 Drawing Sheets

CONTROL APPARATUS OF VEHICLE

CROSS REFERENCE TO RELATED APPLICATIONS

This is a National Stage of International Application No. PCT/JP2012/001568 filed Mar. 7, 2012, the content of all of which is incorporated herein by reference in its entirety.

TECHNICAL FIELD

The present invention relates to a control apparatus of a vehicle having an internal combustion engine and a continuously variable transmission mounted thereon.

BACKGROUND ART

As one of the conventional vehicles each having the internal combustion engine mounted thereon, there has been known the vehicle having the internal combustion engine and the continuously variable transmission mounted thereon to continuously change a power of the internal combustion engine to be transmitted to drive wheels. The vehicle having the continuously variable transmission is equipped with a control apparatus for controlling torque generated by the internal combustion engine and a speed change ratio of the continuously variable transmission to secure an optimum fuel consumption of the vehicle. The control apparatus is adapted to determine a target torque of the internal combustion engine in accordance with an accelerator opening degree and the vehicle speed in response to the operation of an accelerator pedal by a driver.

The control apparatus is constructed to have an engine rotational speed and the torque of the internal combustion engine associated with a requested driving force, and to memorize a fuel consumption map set with an optimum fuel consumption line associated with the engine rotational speed and the torque. The control apparatus is constructed to control the internal combustion engine and the continuously variable transmission to have an operation point represented by the engine rotational speed and the torque of the internal combustion engine moved to the requested driving force on the optimum fuel consumption line.

As one of these control apparatuses of the vehicles, there has been known the control apparatus which can maintain the engine rotational speed at a constant level to suppress bad feelings to the driver by controlling the internal combustion engine and the continuously variable transmission to have the operation point moved on the line different from the optimum fuel consumption line when the target operation point of the internal combustion engine is moved in response to the operation of the accelerator pedal by the driver in the case that a current operation point of the internal combustion engine in the fuel consumption map is on the optimum fuel consumption line (for example see Patent Document 1).

The control apparatus of the vehicle disclosed in the Patent Document 1 is adapted to determine whether or not the target operation point is within a predetermined width area with the optimum fuel consumption line formed therein as a center line when the target operation point is moved by the variation of the accelerator opening degree in the state in which the operation point is on the optimum fuel consumption line.

When the control apparatus determines that the target operation point is within the predetermined width area with the optimum fuel consumption line formed therein as the center line, the operation point is moved on the constant engine rotational speed line different from the optimum fuel consumption line, thereby causing only the torque to be varied with no variation of the engine rotational speed. The control apparatus is adapted to have the operation point moved to the optimum fuel consumption line for a predetermined period of time.

For this reason, the control apparatus of the vehicle disclosed in the Patent Document 1 is adapted to match the driving force with a target driving force without varying the engine rotational speed of the internal combustion engine, thereby preventing the bad feelings caused by the variation of the engine rotational speed to the driver.

Incidentally, the control apparatus of the vehicle provided with the continuously variable transmission including the control apparatus of the vehicle disclosed in the Patent Document 1 is generally adapted to control the internal combustion engine and the continuously variable transmission to have the operation point moved along the optimum fuel consumption line in the above fuel consumption map as much as possible, thereby reducing a fuel consumption amount of the internal combustion engine to improve the fuel consumption.

CITATION LIST

Patent Literature

Patent Document 1: Japanese Patent Application Publication No. 2009-255617

SUMMARY OF INVENTION

Technical Problem

However, the control apparatus of the vehicle disclosed in the Patent Document 1 can improve the fuel consumption in accordance with the fuel consumption amount of the internal combustion engine, however, is not constructed to change the operation point in consideration of the decrease of a transmission efficiency of the power in the continuously variable transmission during the speed change operation.

For this reason, in spite of the fact that there is a phenomenon that the transmission efficiency of the power in the continuously variable transmission is varied in response to a speed change speed, a conventional control apparatus of the vehicle is designed to control the internal combustion engine and the continuously variable transmission in accordance with only the variation of the fuel consumption responsive to an output efficiency of the internal combustion engine.

For this reason, in spite of the fact that there is caused a fuel consumption to be deteriorated due to the lowering of the transmission efficiency of the power in the continuously variable transmission in the speed change state when the operation point is moved along the optimum fuel consumption line, the conventional control apparatus is not considered to the aspect of the reduction of the transmission efficiency of the continuously variable transmission as previously mentioned, so that the conventional control apparatus encounters such a problem that the fuel consumption cannot sufficiently be improved.

The present invention has been made to solve the above problems encountered by the conventional control apparatus, and it is therefore an object of the present invention to provide th control apparatus of the vehicle which can control the internal combustion engine and the continuously variable transmission in accordance with the transmission efficiency of the continuously variable transmission and the fuel consumption amount of the internal combustion engine in the speed change state, thereby making it possible to improve the fuel consumption to a level higher than that of the conventional control apparatus.

Solution to Problem

To achieve the previously mentioned object, the control apparatus of the vehicle according to the present invention comprises an internal combustion engine, and a continuously variable transmission operative to change a speed of a rotation of an output shaft of the internal combustion engine to be outputted to drive wheels, wherein an output of the internal combustion engine and a speed change ratio of the continuously variable transmission being controlled in response to an acceleration request operation by a driver, and the output of the internal combustion engine and the speed change ratio of the continuously variable transmission being set based upon a transmission efficiency of the continuously variable transmission and a fuel consumption amount of the internal combustion engine, the transmission efficiency being responsive to a speed change speed of the continuously variable transmission in accordance with the acceleration request operation.

By the construction as set forth in the above, the control apparatus according to the present invention can set the output of the internal combustion engine and the speed change ratio of the continuously variable transmission in accordance with the power transmission efficiency of the continuously variable transmission during the speed change operation and the fuel consumption amount of the internal combustion engine. For this reason, the control apparatus according to the present invention can optimize the control of the internal combustion engine and the continuously variable transmission in consideration of the decrease of the power transmission efficiency responsive to the speed change speed of the continuously variable transmission. The control apparatus according to the present invention is therefore different from the conventional control apparatus which is adapted to set the output of the internal combustion engine and the speed change ratio of the continuously variable transmission in accordance with only the fuel consumption amount of the internal combustion engine. This results in the fact that the control apparatus according to the present invention can realize the control of the internal combustion engine and the continuously variable transmission, reflecting the findings that the power transmission efficiency of the continuously variable transmission is decreased in response to the increase of the speed change speed of the continuously variable transmission, thereby making it possible to improve the fuel consumption to a level higher than that of the conventional control apparatus.

The control apparatus of a vehicle according to the present invention may preferably be so constructed that a ratio of the fuel consumption amount with respect to the transmission efficiency is calculated and an engine rotational speed at which the ratio is at a smallest level is set to a target rotational speed, the ratio being the ratio of the fuel consumption amount with respect to the transmission efficiency at an engine rotational speed between a current engine rotational speed and an engine rotational speed at which an efficiency of the internal combustion engine is at a maximum level after a speed change operation of the continuously variable transmission.

By the construction as set forth in the above, the control apparatus according to the present invention can set to the target engine rotational speed the engine rotational speed at which the fuel consumption amount becomes lowest for the engine rotational speed between the current engine rotational speed and the engine rotational speed at which the conventional internal combustion engine is in the optimum fuel consumption state.

In the control apparatus of the vehicle according to the present invention as set forth in the above, the speed change speed may preferably be set to be high in response to the increased operation speed of the acceleration request operation, and the transmission efficiency is calculated to be low in response to the increased speed change speed.

By the construction as set forth in the above, the control apparatus according to the present invention can execute a transmission control at the acceleration request by the driver and can control the internal combustion engine and the continuously variable transmission so as to optimize the fuel consumption in response to the speed change speed.

The control apparatus of the vehicle according to the present invention as set forth in the above may preferably comprise a transmission efficiency calculation unit that calculates the transmission efficiency, a fuel consumption amount calculation unit that calculates the fuel consumption amount of the internal combustion engine, and a setting unit that sets the output of the internal combustion engine and the speed change ratio of the continuously variable transmission in accordance with the transmission efficiency calculated by the transmission efficiency calculation unit and the fuel consumption amount calculated by the fuel consumption amount calculation unit.

By the construction as set forth in the above, the control apparatus according to the present invention can set the output of the internal combustion engine and the speed change ratio of the continuously variable transmission in accordance with the power transmission efficiency of the continuously variable transmission calculated by the transmission efficiency calculation unit and the fuel consumption amount of the internal combustion engine calculated by the fuel consumption amount calculation unit. The control apparatus according to the present invention is therefore different from the conventional control apparatus which is adapted to set the output of the internal combustion engine and the speed change ratio of the continuously variable transmission in accordance with only the fuel consumption amount of the internal combustion engine. For this reason, the control apparatus according to the present invention can optimize the control of the internal combustion engine and the continuously variable transmission in consideration of the decrease of the transmission efficiency of the continuously variable transmission during the speed change operation. This results in the fact that the control apparatus according to the present invention can realize the control of the internal combustion engine and the continuously variable transmission, reflecting the findings that the power transmission efficiency of the continuously variable transmission is decreased in response to the increase of the speed change speed of the continuously variable transmission, thereby making it possible to improve the fuel consumption to a level higher than that of the conventional control apparatus.

Advantageous Effects of Invention

The control apparatus of the vehicle according to the present invention can control the internal combustion engine and the continuously variable transmission in accordance with the transmission efficiency of the continuously variable transmission and the fuel consumption amount of the internal combustion engine in the speed change state, thereby making it possible to improve the fuel consumption to a level higher than those of the conventional apparatuses.

BRIEF DESCRIPTION OF DRAWINGS

FIG. 6 is views each showing an efficiency map to be used for the embodiment of the present invention, FIG. 6A showing a standard transmission efficiency for an input rotational speed of 1000 rpm, and FIG. 6B showing the standard transmission efficiency for an input torque of 100 Nm.

DESCRIPTION OF EMBODIMENTS

A control apparatus of a vehicle according to the present embodiment of the present invention will be described hereinafter with reference to FIGS. 1 to 8. First, the construction of the control apparatus will be explained hereinafter.

The embodiment of the present invention will be explained hereinafter with reference to the accompanying drawings.

First, the construction of the control apparatus will be explained hereinafter.

Figure 1:
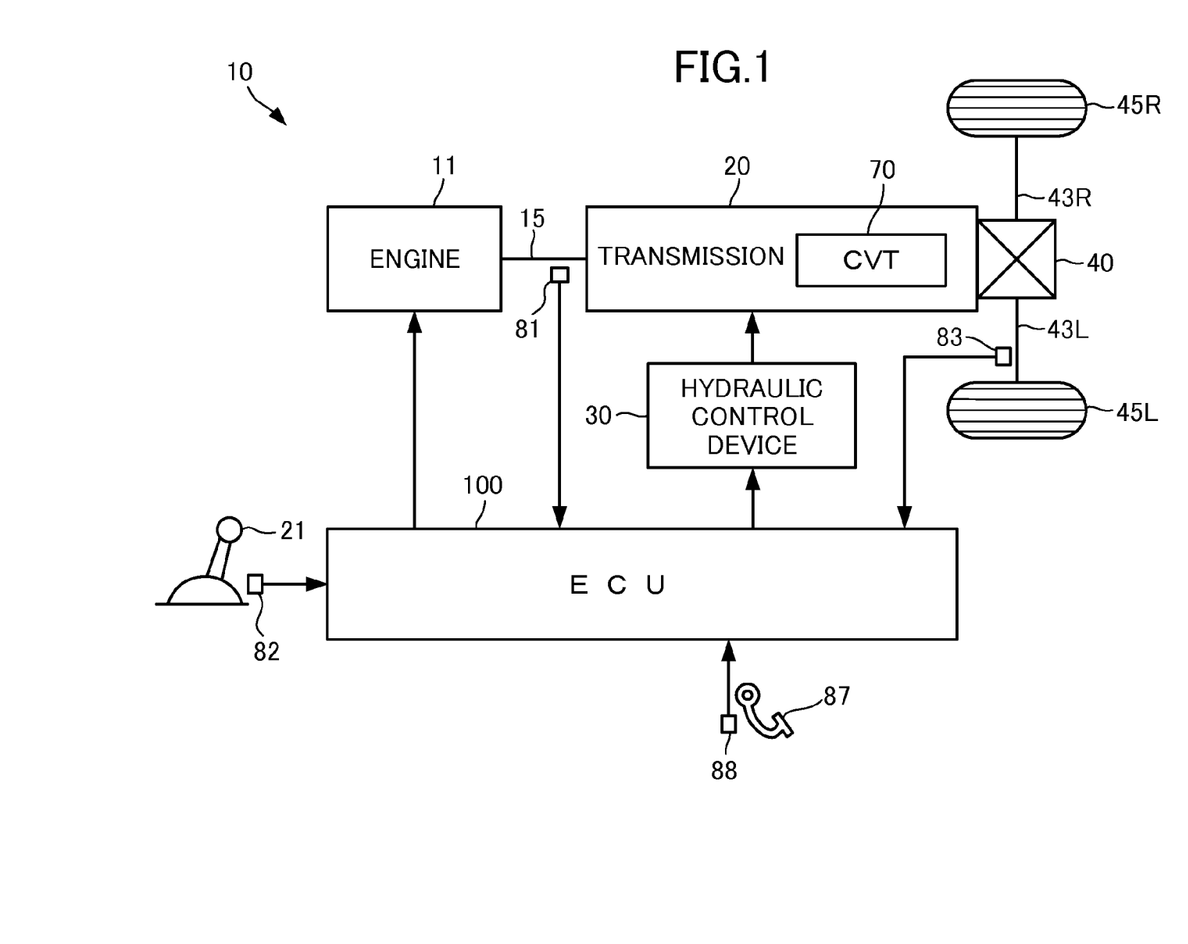
FIG. 1 is a schematic constitution view showing a vehicle having a control apparatus according to the embodiment of the present invention mounted thereon.

FIG. 1 is a schematic constitution view showing the vehicle provided with the control apparatus according to the embodiment of the present invention.

As shown in FIG. 1, the vehicle 10 according to the present embodiment comprises an engine 11 constituting a drive source, a crankshaft 15 constituting an output shaft for transmitting a power generated by the engine 11, a transmission 20 provided with a belt type continuously variable transmission (hereinafter simply referred to as "CVT") 70 for transmitting the power generated by the engine 11 and continuously varying a speed change ratio in response to the travelling state of the vehicle 10, a hydraulic control device 30 for hydraulically controlling the transmission 20, a reduction gear 80 (see FIG. 2) for reducing the speed of the power transmitted by the transmission 20, a differential mechanism 40 inputted with the power from the reduction gear 80, drive shafts 43L, 43R respectively constituting drive shafts for transmitting the powers transmitted by the differential mechanism 40, and drive wheels 45L, 45R to be rotated by the respective powers transmitted from the drive shafts 43L, 43R to drive the vehicle 10.

Further, the vehicle 10 is provided with an electronic control unit (hereinafter simply referred to as "ECU") 100 for controlling the entire equipment and the mechanisms mounted on the vehicle 10. The vehicle 10 is provided with a crank sensor 81, a shift sensor 82, a drive shaft rotational speed sensor 83, and other various kinds of sensors not shown in the drawings. The various sensors are operative to output their respective detection signals to the ECU 100.

The engine 11 is constituted by a known power unit that outputs power by burning a mixture of air and fuel such as gasoline or diesel fuel in combustion chambers formed in a cylinder not shown in the drawings. The engine 11 is operative to intermittently repeat intake, combustion, and exhaust of air-fuel mixture in the combustion chambers, to reciprocate pistons in the cylinder, and to rotate the crankshaft 15 drivably connected with the pistons, thereby transmitting the power to the transmission 20. In addition, the fuel to be used in the engine 11 may be an alcohol fuel including alcohols such as ethanol and the like.

The hydraulic control device 30 has a known hydraulic control circuit which is adapted to switch the oil passages and the hydraulic pressures of oil pumped from an oil pan by an oil pump to be outputted to the transmission 20, thereby controlling the transmission 20. The hydraulic control circuit has a plurality of solenoid valves respectively having states which are adapted to be switched by the ECU 100, thereby controlling the oil passages and the hydraulic pressures of the oil in the hydraulic control circuit.

The differential mechanism 40 is designed to allow the difference between the rotational speeds of the drive wheel 45L and the drive wheel 45R when the vehicle 10 is traveling on a curve or the like. The differential mechanism 40 is adapted to transmit the power transmitted by the reduction gear 80 to the drive wheels 45L, 45R by rotating the drive shafts 43L, 43R. In addition, the differential mechanism 40 can further take a differential lock state in which the difference between the rotational speeds of the drive wheel 45L and the drive wheel 45R is not allowed.

Each of the drive wheels 45L, 45R is provided with a wheel made of, for example, a metal and attached to the drive shafts, and a tire made of, for example, a resin to cover the periphery of the wheel. Further, the drive wheels 45L, 45R are adapted to be rotated by the power transmitted by the drive shafts 43L, 43R to drive the vehicle 10 by the frictional action between the tires and the road surface.

The ECU 100 has a central processing unit (hereinafter simply referred to as a "CPU"), a read only memory (hereinafter simply referred to as a "ROM") to memorize fixed data, a backup memory consisting of unrewritable nonvolatile memory, a random access memory (hereinafter simply referred to as a "RAM") to temporarily memorize data, and I/O interface circuit (not shown either). In addition, the ECU 100 is adapted to oversee the control of the vehicle 10.

Further, the ECU 100 is electrically connected with the crank sensor 81, the shift sensor 82, the drive shaft rotational speed sensor 83, and an accelerator opening degree sensor 88.

The crank sensor 81 is adapted to be controlled by the ECU 100 to detect the number of revolutions, i.e., the rotational speed of the crankshaft 15, and to output to the ECU 100 a detection signal indicative of the detection result outputted by the crank sensor 81. In addition, the ECU 100 can obtain the detection signal inputted by the crank sensor 81 as an engine rotational speed Ne.

The shift sensor 82 is adapted to be controlled by the ECU 100 to detect any one of switching positions of a shift lever 21 selected from among a plurality of switching positions to be taken by the shift lever 21, and to output to the ECU 100 a detection signal indicative of the selected switching position of the shift lever 21.

The drive shaft rotational speed sensor 83 is adapted to be controlled by the ECU 100 to detect the rotational speed of the drive shaft 43L (or 43R), and to output to the ECU 100 a detection signal indicative of the rotational speed of the drive shaft 43L (or 43R). In addition, the ECU 100 is adapted to calculate the traveling speed of the vehicle 10 in accordance with the detection signal inputted by the drive shaft rotational speed sensor 83.

The accelerator opening degree sensor 88 is adapted to be controlled by the ECU 100 to detect an accelerator opening degree indicative of a driver's accelerator operation amount, and to output to the ECU 100 a detection signal indicative of the accelerator opening degree.

Figure 2:
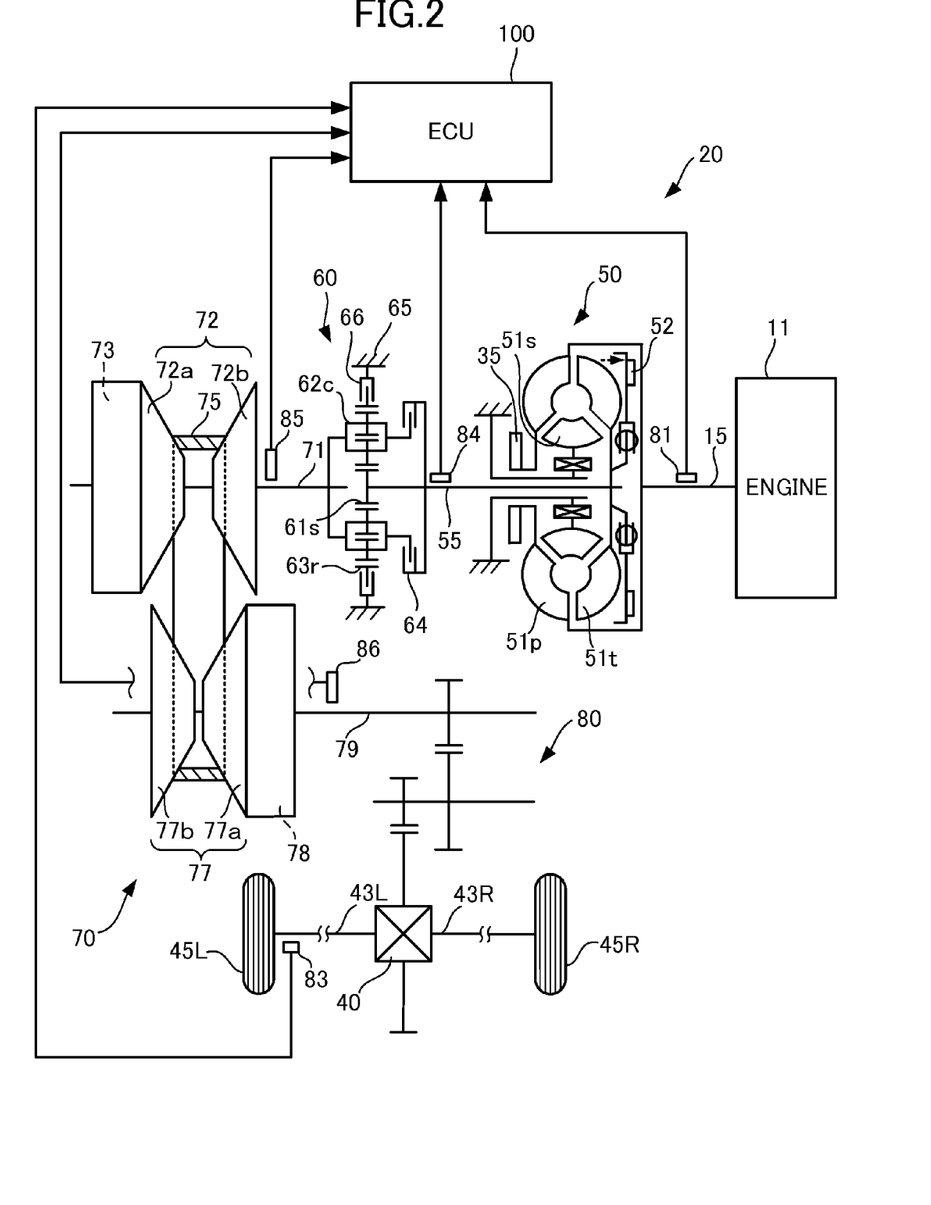
FIG. 2 is a skeleton diagram showing the construction of a control apparatus of the vehicle according to the embodiment of the present invention.

Next, the construction of the transmission 20 will be described with reference to FIG. 2.

The power generated in the engine 11 is adapted to be transmitted to a torque convertor 50 through the crankshaft 15. The power transmitted to the torque convertor 50 is further transmitted to the differential mechanism 40 through a forward-reverse switching device 60, the CVT 70, and the reduction gear 80 to be distributed to the left and right drive wheels 45L, 45R, provided in the left and the right, respectively. That means that the CVT 70 is provided on a power transmission path leading to the drive wheels 45L, 45R (e.g., front wheels) from the engine 11.

In addition, the torque convertor 50 includes a pump impeller 51p connected with the crankshaft 15, a turbine runner 51t connected with the forward-reverse switching device 60 through a turbine shaft 55, and a stator 51s rotatably supported on a non-rotating member through a one-way clutch as will be seen from a known torque convertor that can perform power transmission through a fluid.

In addition, a lock-up clutch (directly connectable clutch) 52 is provided between the pump impeller 51p and the turbine runner 51t to enable the pump impeller 51p and the turbine runner 51t to be rotated integrally with each other to improve fuel consumption.

The forward-reverse switching device 60 is constituted by a double pinion type planetary gear device. A sun gear 61s is connected with the turbine shaft 55 of the torque convertor 50, while a carrier 62c is connected with a primary shaft 71 constituting the input shaft of the CVT 70.

When a forward clutch 64 disposed between the carrier 62c and the sun gear 61s is engaged by the hydraulic pressure, the sun gear 61s, the carrier 62c, a ring gear 63r are driven to rotate together to have the turbine shaft 55 directly connected with the primary shaft 71, thereby making it possible to transmit the power to advance the vehicle 10 to the drive wheels 45L, 45R.

When a reverse brake 66 disposed between the ring gear 63r and a housing 65 is engaged by the hydraulic pressure with the forward clutch 64 being released, pinion gears are revolved while being relatively rotated with respect to the direction of rotation of the sun gear 61s which rotates integrally with the turbine shaft 55, thereby leading to the fact that the carrier 62c is rotated in a direction opposite to the direction of rotation of the turbine shaft 55. The primary shaft 71 connected with the carrier 62c is therefore rotated oppositely to the turbine shaft 55, so that the power to reverse the vehicle 10 is transmitted to the drive wheels 45L, 45R.

On the other hand, the CVT 70 has a primary pulley 72 supported on the primary shaft 71 and having a variable effective diameter, a secondary pulley 77 supported on a secondary shaft 79 constituting the output shaft of the CVT 70 and also having a variable effective diameter, and a transmission belt 75 partly wound around in V-grooves respectively formed in the primary pulley 72 and the secondary pulley 77. The CVT 70 is adapted to transmit the power using the frictional force between the transmission belt 75 functioning as the power transmission element and the inner wall surfaces of the V-grooves of the primary pulley 72 and the secondary pulley 77.

More specifically, the primary pulley 72 has a movable sheave 72a and a fixed sheave 72b respectively having opposing surfaces to form a V-groove in which the transmission belt 75 is received when the transmission belt 75 is partly wound around.

Similarly, the secondary pulley 77 has a movable sheave 77a and a fixed sheave 77b respectively having opposing surfaces to form a V-groove in which the transmission belt 75 is received when the transmission belt 75 is partly wound around.

The primary pulley 72 and the secondary pulley 77 are constructed to have an input side hydraulic cylinder 73 and an output side hydraulic cylinder 78, respectively. The input side hydraulic cylinder 73 is formed in the movable sheave 72a, while the output side hydraulic cylinder 78 is formed in the movable sheave 77a for the purpose of changing the widths of the V-grooves, viz., the effective diameter of the transmission belt 75.

The amount of oil to be supplied to or discharged from the input side hydraulic cylinder 73 of the movable sheave 72a is controlled by the hydraulic control device 30, so that the widths of the V-grooves of the primary pulley 72 and the secondary pulley 77 can be changed, thereby resulting in having the winding diameter, i.e., the effective diameter of the transmission belt 75 changed. This makes it possible to continuously and steplessly vary an actual speed change ratio γ (=actual rotational speed Nin of the primary shaft 71 of the primary pulley 72/actual rotational speed Nout of the secondary shaft 79 of the secondary pulley 77).

Further, the hydraulic pressure PB in the output side hydraulic cylinder 78 of the movable sheave 77a is corresponding to the clamping pressure against the transmission belt 75 of the secondary pulley 77 and to the tension of the transmission belt 75, and is thus adapted to be adjusted by the hydraulic control device 30 to prevent the slip of the transmission belt 75 from generated. The above hydraulic pressure PB is closely related to the tension of the transmission belt 75, i.e., the pressing force against the inner wall surfaces of the V-grooves of the primary pulley 72 and the secondary pulley 77 of the transmission belt 75, and therefore is referred to as a belt tension control pressure, or a belt clamping force control pressure, or a belt pressing force control pressure.

In addition, the transmission 20 has a turbine shaft rotational speed sensor 84, an input shaft rotational speed sensor 85, and an output shaft rotational speed sensor 86 installed thereon, and the ECU 100 is electrically connected with these sensors.

The turbine shaft rotational speed sensor 84 is adapted to detect the rotational speed of the turbine shaft 55 connected with the turbine runner 51t of the torque convertor 50. Further, the turbine shaft rotational speed sensor 84 is adapted to input to the ECU 100 a detection signal indicative of the rotational speed of the turbine shaft 55.

The input shaft rotational speed sensor 85 is adapted to detect the rotational speed of the primary shaft 71 of the primary pulley 72 connected with the carrier 62c. In addition, the input shaft rotational speed sensor 85 is adapted to input to the ECU 100 a detection signal indicative of the rotational speed of the primary shaft 71.

The output shaft rotational speed sensor 86 is adapted to detect the rotational speed of the secondary shaft 79 of the secondary pulley 77 connected with the reduction gear 80. In addition, the output shaft rotational speed sensor 86 is adapted to input to the ECU 100 a detection signal indicative of the rotational speed of the secondary shaft 79.

Here, the ECU 100 is adapted to calculate the actual speed change ratio γ (=actual rotational speed Nin of the primary shaft 71 of the primary pulley 72/actual rotational speed Nout of the secondary shaft 79 of the secondary pulley 77) in accordance with the rotational speed Nin of the primary shaft 71 indicated by the detection signal inputted by the input shaft rotational speed sensor 85 and the rotational speed Nout of the secondary shaft 79 indicated by the detection signal inputted by the output shaft rotational speed sensor 86.

Further, the ECU 100 is adapted to control the speed change ratio of the CVT 70 through the hydraulic control device 30 to have the operating state of the engine 11 brought under the optimum conditions in accordance with the operation conditions such as the speed of the vehicle 10 calculated as described above and the accelerator opening degree requested by the driver, and a required driving force map (optimum fuel consumption curve) which will become apparent as the description proceeds.

The ECU 100 is further adapted to set a target speed change ratio to have the engine 11 operated in the optimum operating state, and to calculate the operation hydraulic pressure to be supplied to the output side hydraulic cylinder 78 and the input side hydraulic cylinder 73 so as to have the actual speed change ratio approach the target speed change ratio, thereby controlling the hydraulic control device 30 in accordance with the calculation result.

Figure 3:
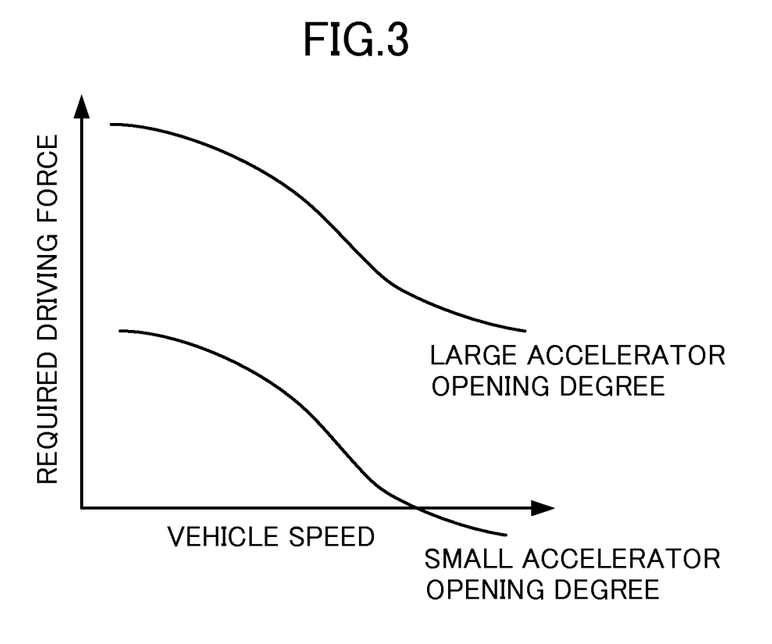
FIG. 3 is a view showing a required driving force map to be used for the embodiment of the present invention.

The ECU 100 is adapted to acquire the required driving force with reference to the required driving force map when the ECU 100 determines that the accelerator opening is varied in accordance with the signal inputted from the accelerator opening degree sensor 88.

As shown in FIG. 3, the required driving force map indicates a map having the vehicle speed and the accelerator opening degree associated with the required driving force, and preliminarily memorized in the ROM. The required driving force map is defined to have the required driving force set to be increased in response to the increased accelerator opening degree.

Therefore, the ECU 100 is adapted to acquire the required driving force and to set the required driving force to a target driving force with reference to the required driving force map. The ECU 100 may calculate the required driving force on the basis of the formula corresponding to the required driving force map in lieu of referring to the required driving force map according to the present invention.

Figure 4:
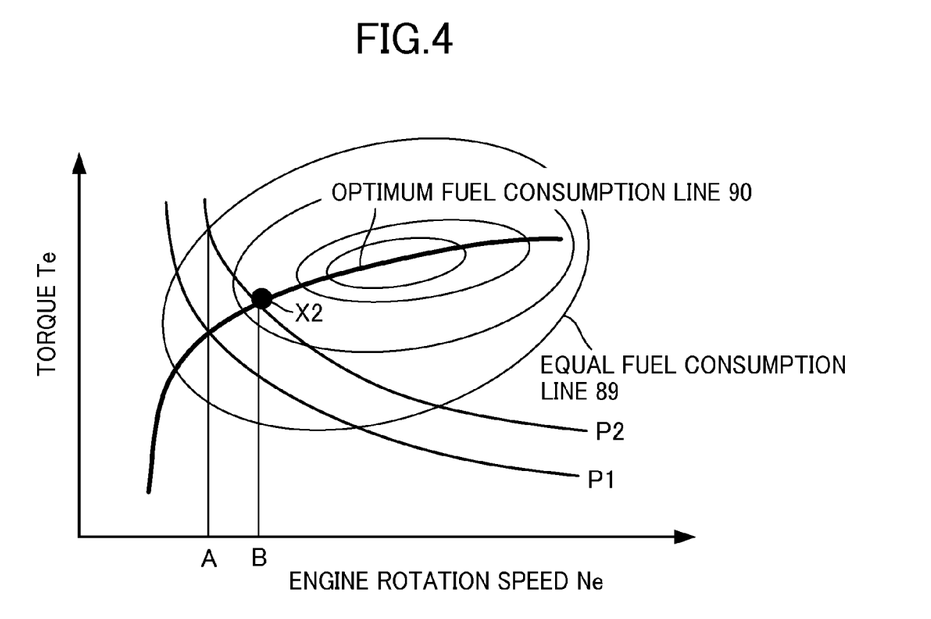
FIG. 4 is a view showing a fuel consumption map to be used for the embodiment of the present invention.

FIG. 4 is a diagram showing a fuel consumption map for calculating the target control quantity (a target engine rotational speed and a target engine torque) in accordance with the target driving force and an optimum fuel consumption line. In addition, the above map is used for setting the target engine rotational speed and the target engine torque in accordance with the efficiency of the engine 11 only. The ECU 100 in the present embodiment is adapted to set the target engine rotational speed and the target engine torque by using not only the fuel consumption map but also a transmission efficiency of the CVT 70 as described below.

In FIG. 4, the horizontal axis represents an engine rotational speed Ne while the vertical axis denotes a torque Te generated by the engine 11. A curve P1 and a curve P2 respectively show equal driving force lines indicative of equal outputs of the engine 11. The outputs of the engine 11 come to be equal to each other if the operation points of the engine 11 (combination of the engine rotational speed Ne and the torque Te) are positioned on the same equal driving force line. The output of the engine 11 has a larger value at the operation point on the equal driving force line shown by the curve P2 than at the operation point on the equal driving force line shown by the curve P1.

Further, the fuel consumption map is formed to have the fuel consumption associated with each of the operation points represented by the engine rotational speed Ne and the torque Te. This fuel consumption is obtained in advance through the experimental measurements. FIG. 4 shows equal fuel consumption lines 89 formed to have the points equal in fuel consumption connected with each other.

In addition, FIG. 4 shows the optimum fuel consumption line 90 of the engine 11. The optimum fuel consumption line 90 shows an operation point at which the engine 11 can efficiently be operated in an optimum fuel consumption state. If the operation point of the engine 11 is on the optimum fuel consumption line 90, the engine 11 can be operated with priority to the fuel consumption. Therefore, the ECU 100 is operative to set the operation point at the intersection of the equal driving force line indicative of the requested driving force and the optimum fuel consumption line 90, so that the engine efficiency can be maximized when the engine 11 generates the requested driving force. The ECU 100 in the present embodiment is operative to calculate the required driving force and the target engine rotational speed Netag and the target torque Tetag from the optimum fuel consumption line 90 when the speed change is performed by considering only the efficiency of the engine 11, thereby controlling the engine 11 in response to the calculation result. For example, explanation will be made about the case in which the equal driving force line corresponding to the target driving force P is the equal driving force line indicated by the curve P2. The ECU 100 is initially operative to calculate the intersection (operation point) X2 of the equal driving force line P2 and the optimum fuel consumption line 90. When the ECU 100 can set the intersection X2 as a target operation point in accordance with the relationship of the operation point indicated by the intersection X2 and the current operation point, the ECU 100 is operative to set the engine rotational speed Ne and the output torque Te corresponding to the operation point X2 as the target engine rotational speed Netag and the target torque Tetag, respectively.

Incidentally, the CVT 70 is constructed to have the widths of the V-grooves of the primary pulley 72 and the secondary pulley 77 varied by the ECU 100 and to have the winding diameter, i.e., the effective diameter of the transmission belt 75 changed, thereby performing the speed change. In response to the speed changing time period from the start of the speed change to the end of the speed change, viz., a speed change speed, the transmission efficiency η, i.e., the ratio of the output torque of the CVT 70 and the input torque of the CVT 70 is changed, thereby leading to apparently affecting the fuel consumption.

Figure 5:
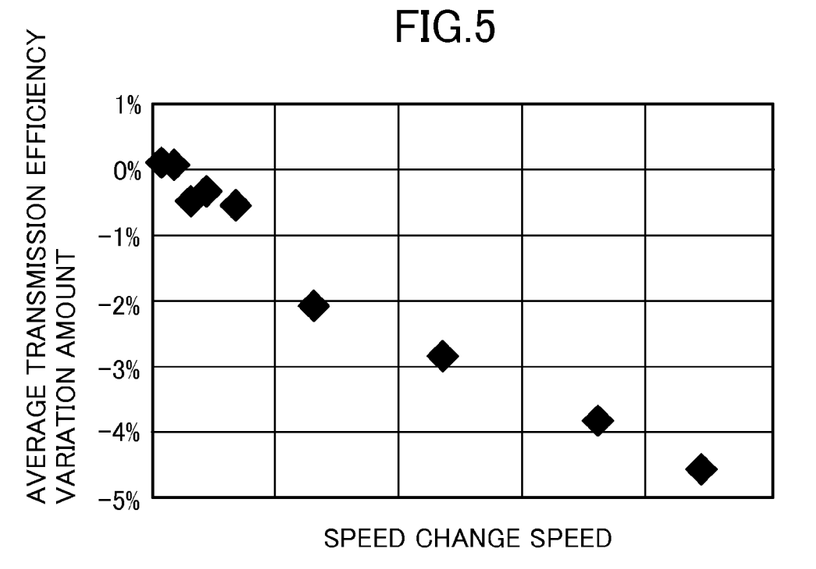
FIG. 5 is a view showing a fluctuation of a transmission efficiency of a continuously variable transmission forming part of the embodiment of the present invention.

FIG. 5 is a graph showing a decrease in the transmission efficiency responsive to the speed change speed. The horizontal axis indicates a speed change speed, while the vertical axis represents a changed amount in the transmission efficiency.

Figure 6A:
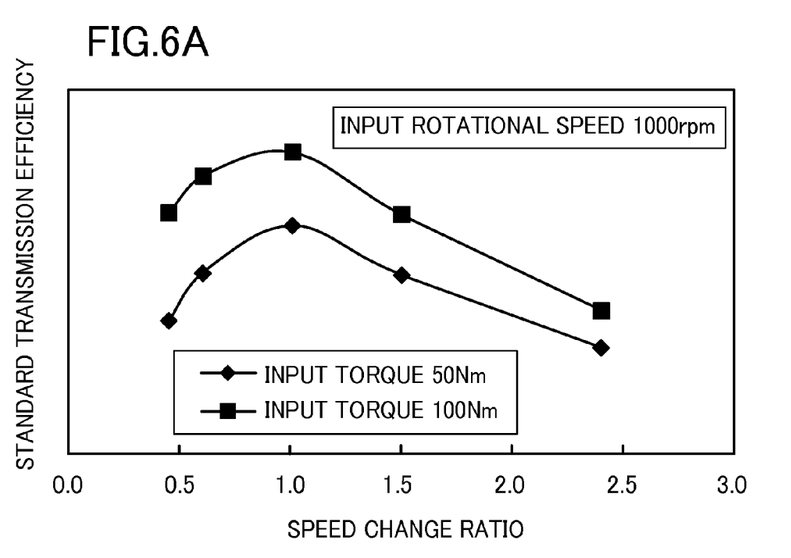
Figure 6B:
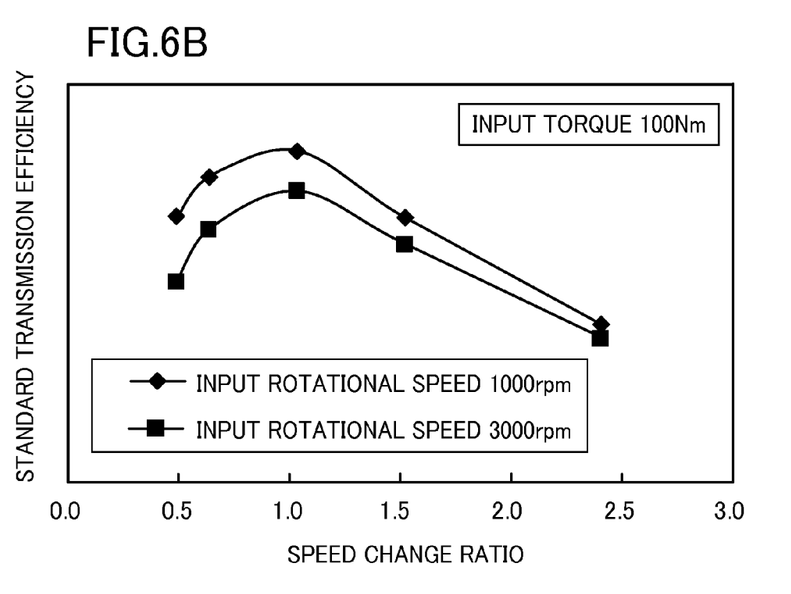
Figure 7:
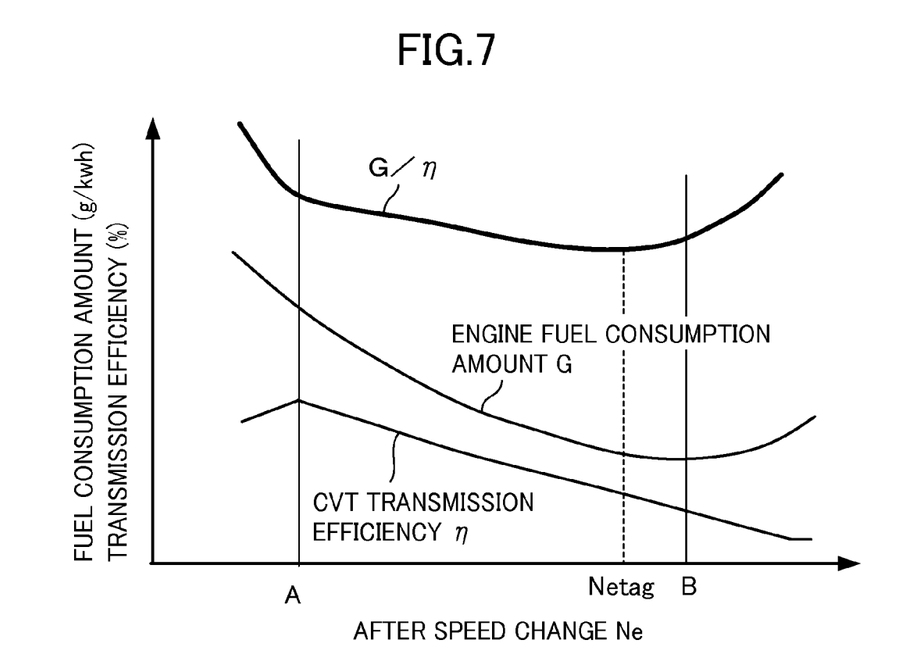
FIG. 7 is a view showing a ratio of a fuel consumption amount and the transmission efficiency raised for the explanation of the embodiment of the present invention.

Here, the changed amount in the transmission efficiency being 0% matches the transmission efficiency η of the CVT 70 in a state in which the transmission is not performed. Hereinafter, the transmission efficiency η of the CVT 70 in the state in which the changed amount in the transmission efficiency is 0% will be referred to as a standard transmission efficiency ηref. This standard transmission efficiency ηref is varied in response to the travelling state of the vehicle 10. The standard transmission efficiency ηref is, as shown in FIGS. 6A and 6B, calculated from the speed change ratio of the CVT 70, the input rotational speed (the rotational speed Nin of the primary shaft 71), and the input torque. The ECU 100 is therefore adapted to acquire the standard transmission efficiency ηref with reference to the efficiency map memorized in the ROM when the ECU 100 calculates the speed change ratio of the CVT 70, the input rotational speed, and the input torque. The ECU 100 is further adapted to calculate the transmission efficiency η by subtracting from the standard transmission efficiency ηref the changed amount of the transmission efficiency defined in response to the speed change speed.

In addition, the efficiency map shown in FIGS. 6A and 6B is a representation of a portion of the actual efficiency map memorized in the ROM. For example, the ECU 100 is adapted to memorize in the ROM a plurality of efficiency maps for the input rotational speeds, including the efficiency map shown in FIG. 6A. The ECU 100 is further adapted to select an efficiency map to be used from among a plurality of efficiency maps in accordance with the current input rotational speed to acquire the standard transmission efficiency ηref. Therefore, the ECU 100 is adapted to memorize in the ROM a plurality of efficiency maps with the speed change ratio, the input rotational speed, and the input torque subdivided in a wider range. Further, the ECU 100 may be adapted to calculate the transmission efficiency η by the formula memorized in the ROM in advance instead of using the efficiency map.

Returning to FIG. 5, the changed amount of the transmission efficiency η for example in the case that the speed change is not performed or otherwise executed at an extremely slow speed is in the vicinity of 0% approximately equal to the case in which the speed change is not executed. In this case, the transmission efficiency η has a value nearly equal to the standard transmission efficiency ηref. On the other hand, the changed amount of the transmission efficiency η is increased as the speed change speed is increased. For this reason, the transmission efficiency η has a value lower by the changed amount than the standard transmission efficiency ηref. This means that the transmission efficiency η is found to be deteriorated in response to the increased speed change speed. This results from the fact that the frictional forces caused between the movable sheave 72a and the fixed sheave 72b and the transmission belt 75 are varied when the effective diameter of the primary pulley 72 is varied in the speed change speed, or the normal component of reaction of the transmission belt 75 is varied.

In addition, the changed amount of the transmission efficiency η and the speed change speed is varied depending upon the specification values of the CVT 70, and is determined in advance by experimental measurements. The ECU 100 is adapted to memorize the changed amount of the transmission efficiency η with respect to the speed change speed in the ROM as a changed amount map. The changed amount map can be obtained by the known interpolation for the graph shown for example in FIG. 5. The ECU 100 is adapted to calculate the changed amount of the transmission efficiency η with reference to the changed amount map when the ECU 100 acquires the standard transmission efficiency ηref with reference to the efficiency map, and to subtract the changed amount value from the standard transmission efficiency ηref, thereby calculating the transmission efficiency η. It will therefore be understood that the ECU 100 in the present embodiment constitutes a transmission efficiency calculation unit as defined in the present invention.

The ECU 100 is adapted to usually perform the speed change in line with the optimum fuel consumption line 90 shown in FIG. 4. When the speed change is executed to have the transmission efficiency η lowered, the rotational speed and the torque of the engine 11 are raised in line with the optimum fuel consumption line 90, thereby decreasing the transmission efficiency η of the CVT 70, and thereby rather leading to increasing a fuel consumption amount for compensating the decrease in the transmission efficiency η.

Therefore, the ECU 100 in the present embodiment is adapted as described below to calculate the transmission efficiency η of the CVT 70 responsive to the speed change speed and the fuel consumption amount of the engine 11 for a predetermined range of the engine rotational speed Ne to be assumed after the speed change operation when the speed change request is generated, and then to calculate the engine rotational speed Ne of the engine 11 after the speed change operation when the fuel consumption amount is at a lowest level from the above calculated values to set the engine rotational speed Ne as the target engine rotational speed Netag.

The ECU 100 is further adapted to calculate a variation amount and a variation speed of the accelerator opening degree in accordance with the signal inputted from the accelerator opening degree sensor 88. The variation speed is calculated by dividing the variation amount of the accelerator opening degree by the time required for the variation of the accelerator opening degree.

The ECU 100 is further adapted to calculate the target driving force and a speed change time from these values thus calculated. Here, the target driving force is, as shown in FIG. 3, calculated in response to the accelerator opening degree and the current vehicle speed. In addition, the ECU 100 is further adapted to have the speed change time set in response to the variation speed of the accelerator opening degree. This means that the acceleration request by the driver is increased in response to the increased variation speed of the accelerator opening degree, so that the speed change time is set to be shortened. The relationship between the speed change time and the variation speed of the accelerator opening degree is memorized in advance in the ROM as a speed change time calculation map.

In addition, the ECU 100 is further adapted to calculate the maximum efficiency engine rotational speed, i.e., the target engine rotational speed on the optimum fuel consumption line in accordance with the target driving force and the fuel consumption map shown in FIG. 4.

The ECU 100 is further adapted to calculate the speed change speed required for changing the speed in the speed change time form the current engine rotational speed to the engine rotational speed between the current engine rotational speed and the maximum efficiency engine rotational speed.

The ECU 100 is further adapted to memorize in the ROM in advance a efficiency map indicative of the transmission efficiency η shown in FIG. 6, and to calculate the transmission efficiency η for the engine rotational speed between the current engine rotational speed and the maximum efficiency engine rotational speed.

Similarly, the ECU 100 is further adapted to calculate the fuel consumption amount G (g/kwh) of the engine 11 for the engine rotational speed between the current engine rotational speed and the maximum efficiency engine rotational speed. It will therefore be understood that the ECU 100 constitutes a fuel consumption amount calculation unit as defined in the present invention.

In this embodiment, such a case is assumed that, for example, the ECU 100 controls the engine 11 and the CVT 70 while an operating point of the engine 11 is varied in response to the accelerator pedal 87 being frequently operated by a driver in accordance with driving conditions while the vehicle 10 is traveling in a city area. Therefore, the fuel consumption amount G (g/kwh) of the engine 11 is intended to indicate the fuel consumption amount consumed in a predetermined short period of time in which the above fuel consumption amount is assumed to continue after the speed change operation. The above short period of time is set to be for example one second through the experimental measurements.

The ECU 100 is further adapted to calculate the ratio G/η of the transmission efficiency η and the fuel consumption amount G of the engine 11 for the engine rotational speed between the current engine rotational speed and the maximum efficiency engine rotational speed.

The ECU 100 is further adapted to set the engine rotational speed having the smallest ratio G/η as the target engine rotational speed, and to set the target engine rotational speed and the target torque Tetag with the torque corresponding the target driving force with reference to the fuel consumption map. It will therefore be understood that the ECU 100 constitutes a setting unit as defined in the present invention.

The ECU 100 is further adapted to adjust the fuel amount and the air amount to be supplied to the combustion chambers of the engine 11 to have the engine 11 generate the target torque Tetag, and to have the speed change ratio of the CVT 70 varied within the speed change period of time calculated with reference to the speed change time calculation map to have the engine rotational speed matched with the target engine rotational speed.

Next, the operation of the transmission control in the present embodiment will be described with reference to FIG. 8. In addition, the process described below is realized by a program memorized in the ROM of the ECU 100 in advance, and is executed at predetermined time intervals by the CPU.

Figure 8:
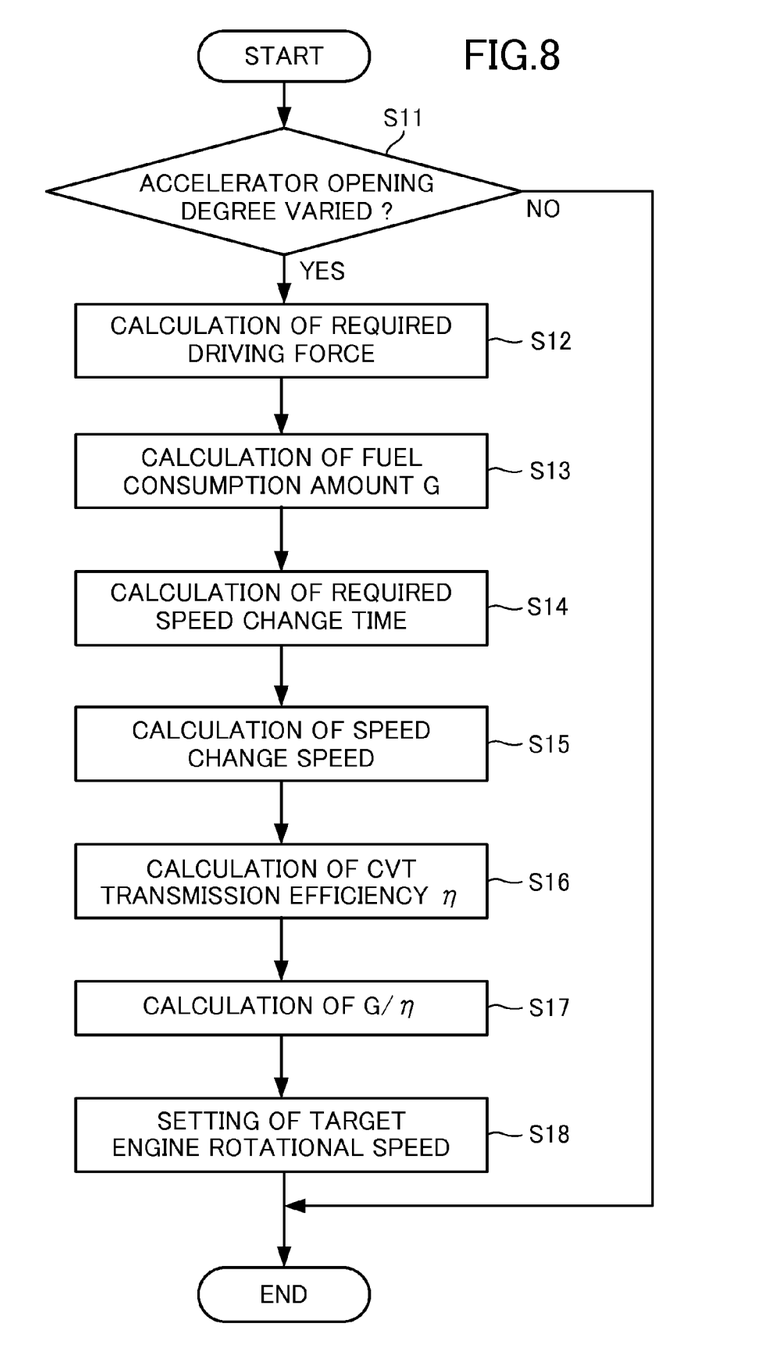
FIG. 8 is a view showing a flow chart of a speed change control to be executed in the embodiment of the present invention.

As shown in FIG. 8, the ECU 100 is first operated to determine whether or not the variation of the accelerator opening degree is generated in accordance with the signal inputted from the accelerator opening degree sensor 88 (step S11). The ECU 100 is operated to move to the END when the ECU 100 determines that the variation of the accelerator opening degree is not generated ("NO" in step S11).

On the other hand, the ECU 100 calculates the required driving force (step S12) when the ECU 100 determines that the variation of the accelerator opening degree is generated ("YES" in step S11). More specifically, the ECU 100 preliminarily memorizes in the ROM the required driving force map (see FIG. 3) to have the accelerator opening degree and the vehicle speed associated with the required driving force. When the ECU 100 calculates the accelerator opening degree from the signal inputted in the step S11 and the vehicle speed in accordance with the signal inputted from the drive shaft rotational speed sensor 83, the ECU 100 calculates the required driving force with reference to the required driving force map.

Then, the ECU 100 calculates the fuel consumption amount G responsive to the engine rotational speed after the speed change operation (step S13). More specifically, the ECU 100 reads the fuel consumption amount G between the points A and B on the equal driving force line corresponding to the required driving force calculated in the step S12 in the fuel consumption map shown in FIG. 4. In the present embodiment, the ECU 100 reads the fuel consumption amount between the points A and B on the equal driving force line from the fuel consumption map.

The ECU 100 then calculates the time required for the speed change (step S14). More specifically, the ECU 100 is adapted to memorize in the ROM a speed change time calculation map having the variation amount and the variation speed of the accelerator opening degree associated with the speed change time required for the speed change. The speed change time calculation map is set in advance in accordance with experimental measurements as described above.

When the ECU 100 calculates the variation amount of the accelerator opening degree and the variation speed of the accelerator opening degree, the ECU 100 calculates the speed change time required for the speed change with reference to the speed change time calculation map.

Next, the ECU 100 calculates the speed change speed responsive to the engine rotational speed after the speed change operation (step S15). More specifically, the ECU 100 calculates the speed change speed to change the current speed change ratio to the target speed change ratio to realize the engine rotational speed between the points A and B on the equal driving force line within the speed change time calculated in the step S14. It should be noted that the engine rotational speeds between the points A and B on the equal driving force line indicate a range in which the engine rotational speed can become the target engine rotational speeds after the speed change operation.

Further, the term speed change speed used in present embodiment means a variation amount of the speed change ratio in per unit time. However, the speed change speed may be represented by using other parameters such as the movement speed of the movable sheave 72a of the primary pulley 72 to be varied in response to the speed change according to the present invention.

Next, the ECU 100 calculates the transmission efficiency η of the CVT 70 at the time of the speed change (step S16). More specifically, the ECU 100 is adapted to memorize in the ROM in advance the efficiency map and the variation amount map as described above. Then, the ECU 100 calculates the transmission efficiency η responsive to the speed change speed calculated in the step S15 for the engine rotational speed between the points A and B on the equal driving force line by subtracting the variation amount of the transmission efficiency from the standard transmission efficiency ηref with reference to the efficiency map and the variation amount map.

The ECU 100 then calculates the ratio G/η of the transmission efficiency η and the fuel consumption amount G responsive to the engine rotational speed between the points A and B on the equal driving force line (step S17).

The ECU 100 then sets the target engine rotational speed (step S18). More specifically, the ECU 100 sets to the target engine rotational speed Netag the engine rotational speed having the smallest ratio among the ratios G/η calculated in response to the engine rotational speed between the points A and B on the equal driving force line in the step S17. The ECU 100 then calculates the output torque of the engine 11 and the speed change ratio of the CVT 70 to have the operation point moved to the point on the equal driving force line indicative of the required driving force calculated in the step S12 in the fuel consumption map, viz., the point where the engine rotational speed Netag is set in the step S18.

In addition, the ECU 100 may be adapted to control the engine 11 and the CVT 70 respectively having the output torque and the speed change ratio calculated in the step S18, and thereafter to control the engine 11 and the CVT 70 to have the operation point of the engine 11 moved to the position overlapping the optimum fuel consumption line on the equal driving force line when the predetermined time has elapsed. In this case, reducing the speed change speed makes it possible to suppress the transmission efficiency η from being decreased.

As will be understood from the foregoing description, the ECU 100 in the present embodiment can set the output of the engine 11 and the speed change ratio of the CVT 70 in accordance with the transmission efficiency η of a power in the speed change in the CVT 70 during the speed change operation and the fuel consumption amount of the engine 11.

For this reason, the ECU 100 in the present embodiment can optimize the control of the engine 11 and the CVT 70 in consideration of the decrease of the power transmission efficiency responsive to the speed change speed of the CVT 70. The optimized control of the engine 11 and the CVT 70 is different from the control performed by the conventional control apparatus which is adapted to set the output of the engine and the speed change ratio of the CVT 70 in accordance with only the fuel consumption amount of the engine. This results in the fact that the control apparatus according to the present invention can realize the control of the engine 11 and the CVT 70, reflecting the findings that the transmission efficiency of the power in the CVT 70 is decreased in response to the increase of the speed change speed of the CVT 70, thereby making it possible to improve the fuel consumption to a level higher than that of the conventional control apparatus.

Further, the ECU 100 can set to the target engine rotational speed Netag the engine rotational speed at which the fuel consumption becomes lowest for the engine rotational speed between the current engine rotational speed and the engine rotational speed at which the conventional engine 11 is in the optimum fuel consumption state.

Further, the ECU 100 can execute the transmission control at the acceleration request by the driver and can control the engine 11 and the CVT 70 so as to optimize the fuel consumption in response to the speed change speed.

The above description has been directed to the case in which the control apparatus according to the present invention is applied to a vehicle FF. However, the control apparatus according to the present invention may be applied to a vehicle FR (Front engine Rear drive).

Further, the above description has been directed to the exemplary case in which the fuel consumption amount G is calculated from the fuel consumption map in response to the engine rotational speed after the speed change operation when the time that the operation point of the engine 11 is kept away from the optimum fuel consumption line 90 in the fuel consumption map is a short period of time. However, the effect of the fuel consumption amount G of the engine 11 with respect to the fuel consumption is greater than the effect of the transmission efficiency η of the CVT 70 in response to the longer period of time that the operation point of the engine 11 after the speed change operation is kept away from the optimum fuel consumption line 90 when the variation frequency of the accelerator opening degree is reduced at the time of a high speed travelling of the vehicle 10 as compared with the variation frequency of the accelerator opening degree at the time of a non-high speed travelling of the vehicle 10.

Therefore, the ECU 100 may be designed to change the value of the fuel consumption amount G to be used for the control in response to the vehicle speed. In this case, the ECU 100 can use a value different from the value at the non-high travelling speed of the vehicle 10 as the fuel consumption amount G when the ECU 100 determines that the vehicle speed exceeds the predetermined value set in advance.

From the foregoing description, it will be understood that the control apparatus according to the present invention can control the internal combustion engine and the continuously variable transmission in accordance with the transmission efficiency η of the continuously variable transmission and the fuel consumption amount of the internal combustion engine at the time of the speed change operation, thereby making it possible to attain such an excellent advantageous effect that the fuel consumption is remarkably increased as compared with the conventional control apparatuses, and therefore the control apparatus according to the present invention is useful as a control apparatus of a vehicle having mounted thereon the internal combustion engine and the continuously variable transmission.

EXPLANATION OF REFERENCE NUMERALS

10: vehicle
11: engine (internal combustion engine)
15: crankshaft
20: transmission (continuously variable transmission)
21: shift lever
30: hydraulic control device
40: differential mechanism
50: torque convertor
52: lock-up clutch
55: turbine shaft
70: CVT
71: primary shaft
72: primary pulley
72a: movable sheave
72b: fixed sheave
73: input side hydraulic cylinder
75: transmission belt
77: secondary pulley
77a: movable sheave
77b: fixed sheave
78: output side hydraulic cylinder
79: secondary shaft
80: reduction gear
81: crank sensor
82: shift sensor
83: drive shaft rotational speed sensor
84: turbine shaft rotational speed sensor
85: input shaft rotational speed sensor
86: output shaft rotational speed sensor
87: accelerator pedal
88: accelerator opening degree sensor
90: optimum fuel consumption line
100: ECU

The invention claimed is:

1. A control apparatus of a vehicle, comprising:
an internal combustion engine, and
a continuously variable transmission operative to change a speed of a rotation of an output shaft of the internal combustion engine to be outputted to drive wheels, the continuously variable transmission including a primary pulley, a secondary pulley and a transmission belt wound around in a V-groove between the primary pulley and the secondary pulley, wherein
an output of the internal combustion engine and a speed change ratio of the continuously variable transmission being controlled in response to an acceleration request operation by a driver, and
the output of the internal combustion engine and the speed change ratio of the continuously variable transmission being set based upon a transmission efficiency percent of the continuously variable transmission and a fuel consumption amount of the internal combustion engine, the transmission efficiency percent being responsive to a speed change speed of the continuously variable transmission in accordance with the acceleration request operation.

2. A control apparatus of a vehicle as set forth in claim 1, in which a ratio of the fuel consumption amount with respect to the transmission efficiency is calculated and an engine rotational speed at which the ratio is at a minimum level is set to a target rotational speed, the ratio being the ratio of the fuel consumption amount with respect to the transmission efficiency percent at an engine rotational speed between a current engine rotational speed and an engine rotational speed at which an efficiency of the internal combustion engine is at a maximum level after a speed change operation of the continuously variable transmission.

3. A control apparatus of a vehicle as set forth in claim 1, in which the speed change speed is increased in response to the increased operation speed of the acceleration request operation, and the transmission efficiency percent is decreased in response to the increased speed change speed.

4. A control apparatus of a vehicle as set forth in claim 1, which further comprises a transmission efficiency calculation unit that calculates the transmission efficiency percent, a fuel consumption amount calculation unit that calculates the fuel consumption amount of the internal combustion engine, and a setting unit that sets the output of the internal combustion engine and the speed change ratio of the continuously variable transmission in accordance with the transmission efficiency percent calculated by the transmission efficiency calculation unit and the fuel consumption amount calculated by the fuel consumption amount calculation unit.

5. A control apparatus of a vehicle as set forth in claim 1, which further comprises an electronic control unit programmed to calculate the transmission efficiency percent, to calculate the fuel consumption amount of the internal combustion engine, and to set the output of the internal combustion engine and the speed change ratio of the continuously variable transmission in accordance with the transmission efficiency percent and the fuel consumption amount.

* * * * *